(12) United States Patent
Mattsson

(10) Patent No.: US 9,705,670 B2
(45) Date of Patent: *Jul. 11, 2017

(54) DATA SECURITY IN A DISCONNECTED ENVIRONMENT

(71) Applicant: Protegrity Corporation, George Town, Grand Cayman (KY)

(72) Inventor: Ulf Mattsson, Cos Cob, CT (US)

(73) Assignee: Protegrity Corporation, Grand Cayman (KY)

( * ) Notice: Subject to any disclaimer, the term of this patent is extended or adjusted under 35 U.S.C. 154(b) by 424 days.

This patent is subject to a terminal disclaimer.

(21) Appl. No.: 14/340,870

(22) Filed: Jul. 25, 2014

(65) Prior Publication Data

US 2014/0337623 A1    Nov. 13, 2014

Related U.S. Application Data

(63) Continuation of application No. 11/906,077, filed on Sep. 27, 2007, now Pat. No. 8,826,449.

(51) Int. Cl.
  *G06F 7/04* (2006.01)
  *H04L 9/08* (2006.01)
  *G06F 21/62* (2013.01)
  *G06F 21/88* (2013.01)
  *G06F 21/31* (2013.01)

(52) U.S. Cl.
  CPC .......... *H04L 9/0816* (2013.01); *G06F 21/31* (2013.01); *G06F 21/6227* (2013.01); *G06F 21/6236* (2013.01); *G06F 21/88* (2013.01); *G06F 2221/2107* (2013.01); *G06F 2221/2135* (2013.01); *H04L 2209/24* (2013.01)

(58) Field of Classification Search
  CPC ... G06F 21/10; G06F 21/31; G11B 20/00086; H04L 9/0816
  See application file for complete search history.

(56) References Cited

U.S. PATENT DOCUMENTS

| | | | |
|---|---|---|---|
| 4,827,508 A * | 5/1989 | Shear | G06F 21/10 705/53 |
| 5,265,221 A | 11/1993 | Miller | |
| 5,271,007 A | 12/1993 | Kurahashi | |
| 5,278,901 A | 1/1994 | Shieh et al. | |
| 5,283,830 A | 2/1994 | Hinsley | |

(Continued)

FOREIGN PATENT DOCUMENTS

| | | | |
|---|---|---|---|
| EP | 0 999 490 A2 | 5/2000 | |
| EP | 1 211 589 A2 | 6/2002 | |

(Continued)

OTHER PUBLICATIONS

U.S. Appl. No. 11/357,741, filed Feb. 17, 2006, Mattsson.

(Continued)

*Primary Examiner* — Ali Abyaneh
(74) *Attorney, Agent, or Firm* — Fenwick & West LLP

(57) ABSTRACT

Systems and methods are provided for the detection and prevention of intrusions in data at rest systems such as file systems and web servers. The systems and methods regulate access to sensitive data with minimal dependency on a communications network. Data access is quantitatively limited to minimize the data breaches resulting from, e.g., a stolen laptop or hard drive.

19 Claims, 3 Drawing Sheets

(56) References Cited

U.S. PATENT DOCUMENTS

| | | | |
|---|---|---|---|
| 5,572,652 | A | 11/1996 | Robusto et al. |
| 5,629,980 | A | 5/1997 | Stefik et al. |
| 5,708,780 | A | 1/1998 | Levergood et al. |
| 5,748,884 | A | 5/1998 | Royce et al. |
| 5,751,949 | A | 5/1998 | Thomson |
| 5,953,012 | A | 9/1999 | Veghte et al. |
| 6,321,201 | B1 | 11/2001 | Dahl |
| 6,405,318 | B1 | 6/2002 | Rowland |
| 6,513,060 | B1 | 1/2003 | Nixon et al. |
| 6,647,400 | B1 | 11/2003 | Moran |
| 6,754,664 | B1 | 6/2004 | Bush |
| 6,766,368 | B1 | 7/2004 | Jakobson et al. |
| 6,950,867 | B1 | 9/2005 | Strohwig et al. |
| 7,120,933 | B2 | 10/2006 | Mattsson |
| 7,305,707 | B2 | 12/2007 | Mattsson |
| 7,406,714 | B1 | 7/2008 | Nachenberg |
| 7,594,266 | B2 | 9/2009 | Mattsson et al. |
| 2001/0052014 | A1 | 12/2001 | Sheymov et al. |
| 2002/0007461 | A1 | 1/2002 | Garrisson et al. |
| 2002/0023227 | A1 | 2/2002 | Sheymov et al. |
| 2002/0059144 | A1 | 5/2002 | Meffert et al. |
| 2002/0083178 | A1 | 6/2002 | Brothers |
| 2002/0174352 | A1 | 11/2002 | Dahl |
| 2003/0101355 | A1 | 5/2003 | Mattsson |
| 2004/0003270 | A1 | 1/2004 | Bourne et al. |
| 2004/0139448 | A1 | 7/2004 | Hope et al. |
| 2004/0267893 | A1 | 12/2004 | Lin |
| 2005/0004873 | A1 | 1/2005 | Pou et al. |
| 2005/0015626 | A1 | 1/2005 | Chasin |
| 2005/0039034 | A1 | 2/2005 | Doyle et al. |
| 2005/0114672 | A1 | 5/2005 | Duncan et al. |
| 2005/0138110 | A1 | 6/2005 | Redlich et al. |
| 2006/0008256 | A1* | 1/2006 | Khedouri .......... G06F 17/30038 386/234 |
| 2006/0106732 | A1* | 5/2006 | Coley .................... G06F 21/10 705/59 |
| 2006/0179296 | A1 | 8/2006 | Bartlett |
| 2007/0150299 | A1 | 6/2007 | Flory |
| 2007/0198462 | A1 | 8/2007 | Ohta et al. |
| 2007/0203846 | A1 | 8/2007 | Kavuri et al. |

FOREIGN PATENT DOCUMENTS

| | | |
|---|---|---|
| EP | 1315065 A1 | 5/2003 |
| GB | 2 242 295 | 9/1991 |
| WO | WO 01/35226 | 5/2001 |
| WO | WO 03/044638 | 5/2003 |

OTHER PUBLICATIONS

23 DBMS Obfuscation Toolkit; Oracle8i Suoolied PUSQL Packages Reference Release 2.

Applied Cryptography Second Edition: protocols, algorithms, and source code in C; Bruce Schneier, John Wiley & Sons 1996, Das. 10-17, 193-197, 208-210 and 270-278.

Bhattacharyya, R. K., "*Security of Network element Databases Against Increasing Threats of Intrusion via Operations Interfaces*", Proceedings: The Institute of Electrical and Electronics Engineers, 1988 International Carnahan Conference on Security Technology: Crime Countermeasures (Lexington, KY, Oct. 5-7, 1988), DD. 51-64.

Database Security in Oracle8i, An Oracle Technical White Paoer, Nov. 1999, oas. 1-30.

Denning, Dorothy E., "*An Intrusion-Detection Model*", IEEE Transactions on Software Engineering, vol. SE-13, No. 2 (Los Alamitos, CA, Feb. 1987), nn. 222-232.

An Introduction to Database Systems 7th Ed.; C.J. Date, Addison Wesley Longman, Inc. 2000 Das. 43-47, 69-78, 249-253 and 520-524.

Snapp, Steven R. et al., "*A System for Distributed Intrusion Detection*", IEEE 1991, pp. 170-176.

United States Office Action, U.S. Appl. No. 11/906,077, Oct. 17, 2013, 14 pages.

United States Office Action, U.S. Appl. No. 11/906,077, Oct. 5, 2012, 12 pages.

United States Office Action, U.S. Appl. No. 11/906,077, Feb. 15, 2012, 16 pages.

United States Office Action, U.S. Appl. No. 11/906,077, Jun. 7, 2011, 15 pages.

United States Office Action, U.S. Appl. No. 11/906,077, Sep. 30, 2010, 19 pages.

\* cited by examiner

DATA SECURITY IN A DISCONNECTED ENVIRONMENT

CROSS-REFERENCE TO RELATED APPLICATIONS

This application is a continuation of U.S. application Ser. No. 11/906,077, filed Sep. 27, 2007, now U.S. Pat. No. 8,826,449, which is incorporated by reference in its entirety. This application is also related to, but does not claim priority to, U.S. patent application Ser. No. 11/540,467, filed Sep. 29, 2006, now issued as U.S. Pat. No. 7,594,266, which in turn claims priority to U.S. patent application Ser. No. 11/510,185, filed Aug. 25, 2006, now issued as U.S. Pat. No. 7,305,707, which in turn claims priority under 35 U.S.C. §119 to European application number EPC 01127906.4, filed Nov. 23, 2001. The entire contents of each of these references are incorporated by reference herein.

TECHNICAL FIELD

The present invention generally relates to systems and methods of data protection in disconnected environments.

BACKGROUND INFORMATION

In database security, it is a known problem to avoid attacks from persons who have access to a valid user-ID and password. Such persons cannot be denied access by the normal access control system, as they are in fact entitled to access to a certain extent. Such persons can be tempted to access improper amounts of data, by-passing the security. Several solutions to such problems have been suggested and are discussed below.

I. Network-Based Detection

Network intrusion monitors are attached to a packet-filtering router or packet sniffer to detect suspicious behavior on a network during the suspicious behavior. The router or sniffer looks for signs that: a network is being investigated for attack with a port scanner; users are falling victim to known traps like url or .lnk; or the network is actually under an attack such as through SYN flooding or unauthorized attempts to gain root access (among other types of attacks). Based on user specifications, these monitors can then record the session and alert the administrator or, in some cases, reset the connection. Some examples of such tools include NetRanger and Cisco Secure Intrusion Detection System available from Cisco Corporation of San Jose, Calif. and RealSecure® available from Internet Security Systems, Inc. (ISS) of Atlanta, Ga. as well as some public domain products like Klaxon, available at ftp://ftp.eng.auburn.edu/pub/doug/, that focus on a narrower set of attacks.

II. Server-Based Detection

Server-based detection tools analyze log, configuration and data files from individual servers as attacks occur, typically by placing some type of agent on the server and having the agent report to a central console. An example of these tools public domain tools that perform a much narrower set of functions is Tripwire®, available at http://sourceforge.net/projects/tripwire/, which checks data integrity. Tripwire® will detect any modifications made to operating systems or user files and send alerts to ISS's RealSecure® product. The RealSecure® product will then conduct another set of security checks to monitor and combat any intrusions.

III. Security Query and Reporting Tools

Security query and reporting tools query network operating system (NOS) logs and other related logs for security events and/or glean logs for security trend data. Accordingly, these tools do not operate in real-time and rely on users providing the right questions of the right systems. For a typical example, a query might be how many failed authentication attempts have occurred on certain NT servers in the past two weeks.

IV. Inference Detection

A variation of conventional intrusion detection is detection of specific patterns of information access known as inference detection. Inference detection is deemed to signify that an intrusion is taking place, even though the user is authorized to access the information. A method for such inference detection, i.e., a pattern oriented intrusion detection, is disclosed in U.S. Pat. No. 5,278,901 to Shieh et al., which is incorporated herein by reference.

None of these solutions are however entirely satisfactory. A primary drawback is that each solution concentrates on already effected queries, providing at best an information that an attack has occurred.

Moreover, the above solutions presume a networked environment. While, such environments are becoming increasingly ubiquitous, numerous situations still exist where access to sensitive data must be regulated without persistent and/or frequent access to networked security devices. For example, employees may need access to databases while traveling and without network access. While the replication of a database to a laptop is easily accomplished, protection of the data is critical, as demonstrated by recent well-publicized security breaches involving lost or stolen laptops.

Furthermore, reliance on networked security devices introduces a point of failure, which may unacceptable in some situations. For example, while a retail store's cash registers may be networked, the cash registers should still be able to operate and access resources such as customer databases in the event of a network disruption.

Finally, it may be desirable to distribute intrusion detection analysis to the client level for greater performance.

SUMMARY OF THE INVENTION

The invention relates, but is not necessarily limited, to protecting data in a disconnected environment.

One embodiment of the invention is directed to a method for data protection comprising receiving a request for data encrypted with an encryption key, granting the request if an indicator value is within a threshold, and modifying the indicator value. This embodiment may have a variety of features. For example, advancing the indicator value may comprise modifying the indicator value by one. Advancing the indicator value may comprise modifying the indicator value for each record in the request. Advancing the indicator value may comprise modifying the indicator value for each record in a result of the request.

The method may further include denying the request if the indicator value exceeds the threshold. The method may also include receiving instructions from an access control system to modify the indicator value. The method may include receiving instructions from an access control system to modify the threshold. The method may also include notifying the access control system of the indicator value and/or notifying the access control system that the indicator value exceeds the threshold.

Other variations of the above embodiment may include prompting a user to connect to a network if the indicator value exceeds the threshold. The method may include sending information on data requests to the access control system. The indicator value may be specific to the encryption key.

The request may be a request to move the data from a first location to a second location, a request to move the data from a first application to a second application and/or a request to print the data. Further variations may include reencrypting the data and/or masking the data.

Another embodiment of the invention is directed to a method for data protection comprising receiving an intrusion detection profile from an access control system, receiving a request for data in a data at rest system from the user, determining whether a result of said request causes the user to violate at least one item access rule defined in the intrusion detection profile associated with the user, and denying the request if at least one item access rule is violated. The profile includes at least one item access rule, wherein a user is associated with the intrusion detection profile.

The above embodiment can have a variety of features. For example, the method may include notifying the access control system if at least one item access rule is violated. The method may also include accumulating results from performed requests and determining whether the accumulated results violate any one of said at least one item access rule. The item access rules may be selected from the group of a rule that limits access to the data at rest system at certain defined dates and times, a rule that prohibits access to the data at rest system, a rule that limits the user's ability to run a query at certain defined dates and times and a rule that prohibits the user from running a query.

The intrusion detection profile may also include at least one inference pattern. The method may further include accumulating results from performed previous requests to an item, comparing the received request with at least one inference pattern in order to determine whether a combination of accesses to the item match said inference pattern, and denying the received request if a combination of accesses in the record match at least one inference pattern. At least one of said at least one inference pattern may be a Bayesian inference pattern.

Another embodiment is directed to a computer-readable medium whose contents cause a computer to perform a method for data protection comprising receiving a request for data encrypted with an encryption key, granting the request if an indicator value is less than a threshold, and advancing the indicator value.

Another embodiment is directed to a computer-readable medium whose contents cause a computer to perform a method for data protection comprising receiving an intrusion detection profile from an access control system, receiving a request for data in a data at rest system from the user, determining whether a result of said request causes the user to violate at least one item access rule defined in the intrusion detection profile associated with the user, and denying the request if at least one item access rule is violated. The profile includes at least one item access rule, wherein a user is associated with the intrusion detection profile.

BRIEF DESCRIPTION OF THE DRAWINGS

The drawings generally are to illustrate principles of the invention and/or to show certain embodiments according to the invention. The drawings are not necessarily to scale. Each drawing is briefly described below.

DESCRIPTION

The present invention overcomes many of the prior art problems associated with detecting and preventing intrusions in data at rest systems. The advantages, and other features of the methods and systems disclosed herein, will become more readily apparent to those having ordinary skill in the art from the following detailed description of certain preferred embodiments taken in conjunction with the drawings which set forth representative embodiments of the present invention.

Unless otherwise specified, the illustrated embodiments can be understood as providing exemplary features of varying detail of certain embodiments, and therefore, unless otherwise specified, features, components, modules, elements, and/or aspects of the illustrations can be otherwise combined, interconnected, sequenced, separated, interchanged, positioned, and/or rearranged without materially departing from the disclosed systems or methods. Additionally, the shapes and sizes of components are also exemplary and unless otherwise specified, can be altered without materially affecting or limiting the disclosed technology.

Figure 1:
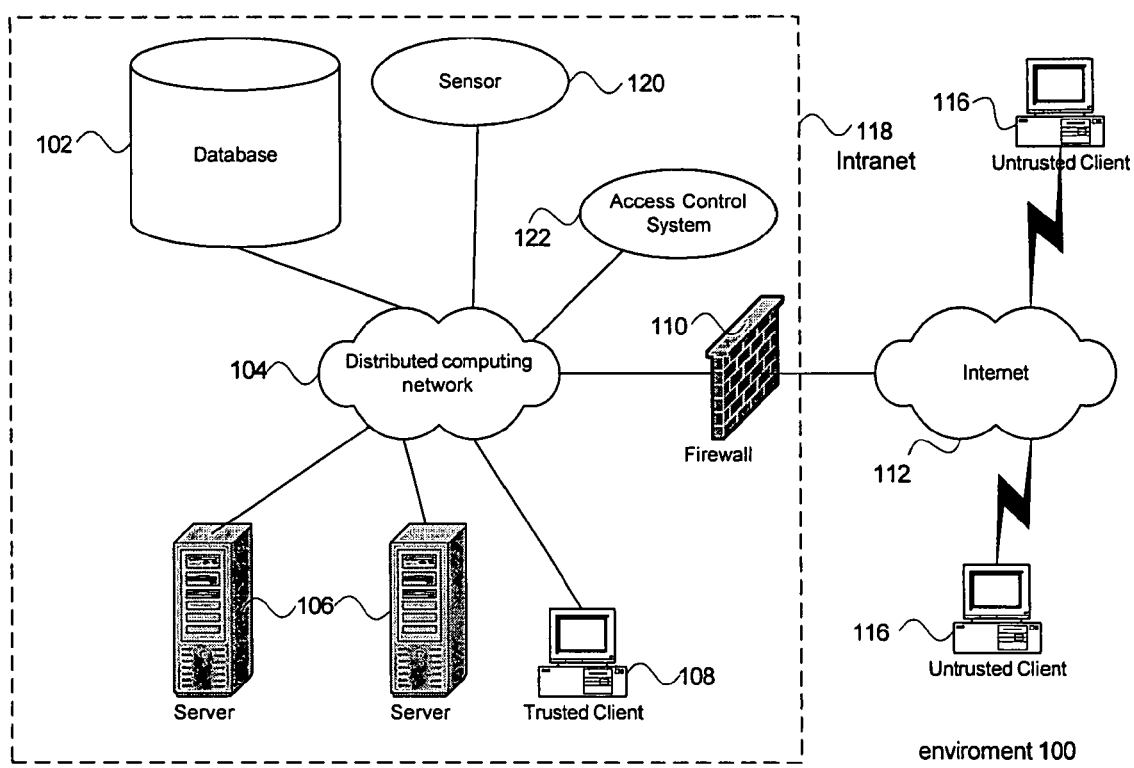
FIG. 1 is a diagram showing a network environment for data at rest systems such as databases and file servers in accordance with an embodiment of the subject technology.

Referring now to FIG. 1, an environment 100 contains a database 102, servers 106, and clients, trusted 108 and untrusted 116. For simplicity, only one database 102, two servers 106, one trusted client 108 and two untrusted clients 116 are shown. The database 102, servers 106, and trusted client 108 are connected via a distributed computing network 104 via communication channels, whether wired or wireless, as is known to those of ordinary skill in the pertinent art. The distributed computing network 104 may be one or more selected from the group: LAN, WAN, Internet, Intranet, Virtual Private Network, Ethernet and the like now known and later developed. While represented schematically as part of a separate entity or enterprise 118 in FIG. 1, a database 102 may be software or hardware integrated with a computer such as a server 106 or clients 108, 116.

The enterprise 118 is connected to the untrusted clients 116 via a network 112 such as the Internet. To control access to the network 104, a firewall 110 governs communication between the networks 104, 112. Firewalls 110 are well-known to those of ordinary skill in the art and, thus, not further described herein.

The servers 106 can be one or more servers known to those skilled in the art that are intended to be operably connected to a network so as to operably link to a plurality of clients 106, 108, and 116 via the distributed computer network 104. As illustration, the server 106 typically includes a central processing unit including one or more microprocessors such as those manufactured by Intel or AMD, random access memory (RAM), mechanisms and structures for performing I/O operations, a storage medium such as a magnetic hard disk drive(s), and an operating system for execution on the central processing unit. The hard disk drive of the servers 106 may be used for storing data, client applications and the like utilized by client applications. The hard disk drives of the server 106 also are typically provided for purposes of booting and storing the operating system, other applications or systems that are to be executed on the servers 106, paging and swapping between the hard disk and the RAM.

It is envisioned that the server 106 can utilize multiple servers in cooperation to facilitate greater performance and stability of the subject invention by distributing memory and processing as is well known. For reference, see, for example, U.S. Pat. No. 5,953,012 to Venghte et al. and U.S. Pat. No. 5,708,780 to Levergood et al.

The plurality of clients 108, 116 can be desktop computers, laptop computers, personal digital assistants, cellular telephones and the like now known and later developed. The clients 108, 116 can have displays as will be appreciated by those of ordinary skill in the pertinent art. The display may be any of a number of devices known to those skilled in the art for displaying images responsive to outputs signals from the computers 108, 116. Such devices include, but are not limited to, cathode ray tubes (CRT), liquid crystal displays (LCDs), plasma screens and the like. Although a simplified diagram is illustrated in FIG. 1 such illustration shall not be construed as limiting the present invention to the illustrated embodiment. It should be recognized that the signals being output from the computer can originate from any of a number of devices including PCI or AGP video boards or cards mounted within the housing of the clients 108, 116 that are operably coupled to the microprocessors and the displays thereof.

The clients 108, 116 typically include a central processing unit including one or more micro-processors such as those manufactured by Intel or AMD, random access memory (RAM), mechanisms and structures for performing I/O operations (not shown), a storage medium such as a magnetic hard disk drive(s), a device for reading from and/or writing to removable computer readable media and an operating system for execution on the central processing unit. According to one embodiment, the hard disk drive of the clients 108, 116 is for purposes of booting and storing the operating system, other applications or systems that are to be executed on the computer, paging and swapping between the hard disk and the RAM and the like. In one embodiment, the application programs reside on the hard disk drive for performing the functions in accordance with the transcription system. In another embodiment, the hard disk drive simply has a browser for accessing an application hosted within the distributed computing network 104. The clients 108, 116 can also utilize a removable computer readable medium such as a CD or DVD type of media that is inserted therein for reading and/or writing to the removable computer readable media.

The servers and clients typically include an operating system to manage devices such as disks, memory and I/O operations and to provide programs with a simpler interface to the hardware. Operating systems include: Unix®, available from the X/Open Company of Berkshire, United Kingdom; FreeBSD, available from the FreeBSD Foundation of Boulder, Colo.: Linux®, available from a variety of sources; GNU/Linux, available from a variety of sources; POSIX®, available from IEEE of Piscataway, N.J.; OS/2®, available from IBM Corporation of Armonk, N.Y.; Mac OS®, Mac OS X®, Mac OS X Server®, all available from Apple Computer, Inc. of Cupertino, Calif.; MS-DOS®, Windows®, Windows 3.1®, Windows 95®, Windows 2000®, Windows NT®, Windows XP®, Windows Server 2003®, Windows Vista®, all available from the Microsoft Corp. of Redmond, Wash.; and Solaris®, available from Sun Microsystems, Inc. of Santa Clara, Calif. See generally Andrew S. Tanenbaum, *Modern Operating Systems* (2d ed. 2001). Operating systems are well-known to those of ordinary skill in the pertinent art and, thus, not further described herein.

The file system may implement one or more file systems to handle how disks and other storage means are "structured, named, accessed, used, protected and implemented." Ibid. Examples of file systems include: ext2, ext3 and XFS, implemented as part of various Linux flavors; ReiserFS and Reiser4, both supported for GNU/Linux; Google File System, produced by Google Inc. of Menlo Park, Calif.; and FAT, FAT12, FAT16, FAT32, NTFS, implemented as part of the Windows® operating systems by Microsoft Corp. of Redmond, Wash.; HFS, HFS+, both implemented as part of Mac OS® by Apple Computer, Inc. of Cupertino, Calif. File systems are well-known to those of ordinary skill in the pertinent art and, thus, not further described herein.

The environment also includes one or more sensors 120 and one or more access control systems 122. The one or more sensors 120 may be implemented as part of a server 106, a client 108, 116, a database 102 or as a freestanding network component (e.g., as a hardware device). The sensor 120 may be implemented with technology similar to the Defiance™ TMS Monitor, available from Protegrity Corp. of Stamford, Conn. Preferably, the one or more sensors 120 implemented separately from any data at rest systems, such as databases or file systems, in order to monitor bidirectional data flows in the network.

The access control system 122 may be any system or apparatus capable of producing an intrusion detection profile. The access control system 122 may be implemented in many ways including, but not limited to, embodiment in a server 106, a client 108, 116, a database 102 or as a freestanding network component (e.g., as a hardware device). In a preferred embodiment, the access control system 122 is part of the Secure.Data™ server, available from Protegrity Corp. of Stamford, Conn. The access control system 122 continually monitors user activity, and prevents a user from accessing data that the user is not cleared for. This process is described in detail in WO 97/49211, hereby incorporated by reference.

The flow charts illustrated herein represent the structure or the logic of methods for an embodiment of a computer program according to the invention. The program is preferably executed in the environment 100. The flow charts illustrate the structures and functions of the computer program code elements (which could instead be implemented entirely or partially as one or more electronic circuits). As such, the present disclosure may be practiced in its essential embodiments by a machine component that renders the program code elements in a form that instructs a digital processing apparatus (e.g., computer) to perform a sequence of function steps corresponding to those shown in the flow charts. The software and various processes discussed herein are merely exemplary of the functionality performed by the disclosed technology and thus such processes and/or their equivalents may be implemented in commercial embodiments in various combinations and quantities without materially affecting the operation of the disclosed technology.

Figure 2:
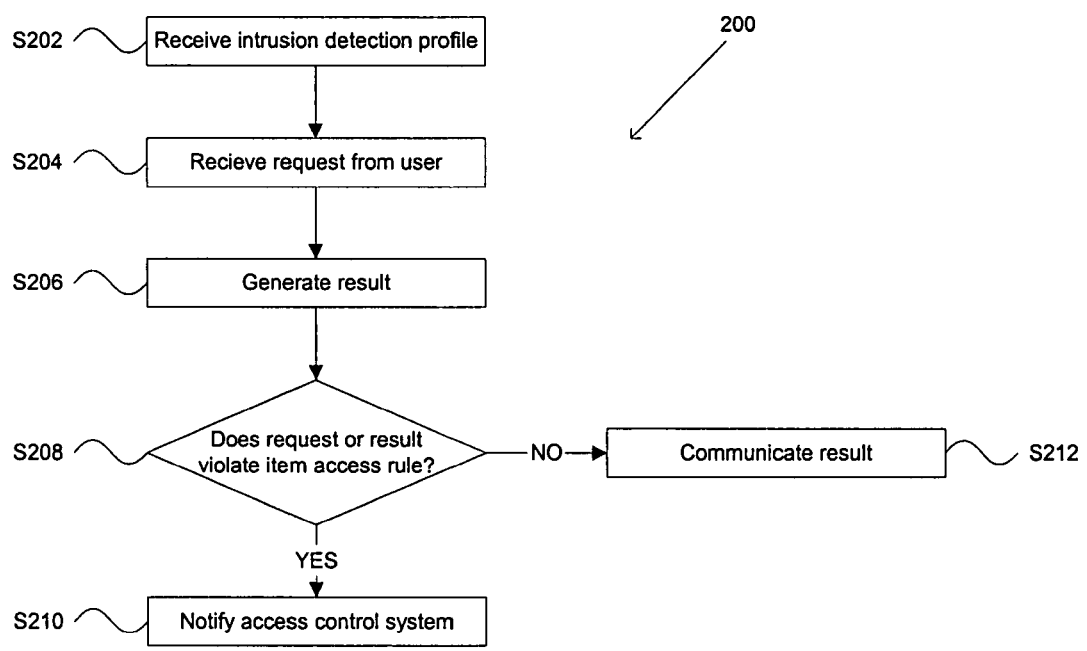
FIG. 2 is a flow diagram illustrating a method in accordance with an embodiment of the subject technology.

Referring now to FIG. 2, there is illustrated a flowchart 200 depicting a process for detecting and preventing intrusion in a data at rest system. A data at rest system, such as a file system or web server, stores information in a durable manner and is to be distinguished from a database.

At step S202, the access control system 122 distributes intrusion detection profiles to the one or more sensors 120. As will be discussed below, the profiles are created protect data stored within an intranet 118.

An intrusion detection profile may exist in many forms including, but not limited to, plain text, mathematical equations and algorithms. The profile may contain one or more item access rules. Each item access rule may permit and/or restrict access to one or more resources. A rule may apply generally to all users, or the rule may apply to specific users, groups, roles, locations, machines, processes, threads and/or applications. For example, system administrators may be able to access particular directories and run certain applications that general users cannot. Similarly, some employees may be completely prohibited from accessing one or more servers or may have access to certain servers, but not certain directories or files.

Furthermore, rules may vary depending on the date and time of a request. For example, a backup utility application may be granted access to a server from 1:00 AM until 2:00 AM on Sundays to perform a backup, but may be restricted from accessing the server otherwise. Similarly, an employee may have data access privileges only during normal business hours.

Additionally, the rules need not simply grant or deny access, the rules may also limit access rates. For example, an employee may be granted access to no more than 60 files per hour without manager authorization. Such limitations may also be applied at more granular levels. For example, an employee may have unlimited access to a server, but be limited to accessing 10 confidential files per hour.

Rules may also grant, prohibit and/or limit item access for a particular type of network traffic. Item access rules may discriminate between various types of network traffic using a variety of parameters as is known to one of ordinary skill in the art including, but not limited to, whether the traffic is TCP or UDP, the ISO/OSI layer, the contents of the message and the source of the message.

These types of item access rules, as well as other rules known to those skilled in the art now or in the future, may be implemented in isolation or in combination. For example, an employee in a payroll department might be granted increased access to timesheet files on Mondays in order to review paychecks before releasing information to the company's bank. This same employee might have less access from Tuesday through Sunday.

In some embodiments, data intrusion profiles may be fashioned by an entity such as the access control system 122 or an administrator to reflect usage patterns. For example, an employee, who during the course of a previous year never accesses a server after 7:00 PM, may be prohibited from accessing the database at 8:15 PM as this may be indicative of an intrusion either by the employee or another person who has gained access to the employee's login information.

Still referring to FIG. 2, at step S204, a request for access to the data at rest system 102 is received. This request may come from a variety of sources (referred herein to as a "requestor") including, but not limited to, servers 106 and clients 108, 116. The request may be for data including, but not limited to, file(s), record(s), image(s), audio file(s), video file(s), object(s), software component(s), web page(s) and application(s). The request also may be for a system resource including, but not limited to, process(es), thread(s), clock cycles, network connection(s), network service(s), disk space, memory and band width. The request may occur in a variety of ways including, but not limited to, a database query, a system call, an interrupt, an exception and a CORBA request.

At step S206, a result is generated for the request by executing the request, as is known to those of skill in the art. For example, if the request is wild card search, the request is executed against the appropriate server. It is noted that executing the request may be omitted in some circumstances, particularly where the request constitutes a per se violation of an item access rule. An example of such a violation might be requesting all mechanical drawings for a project that an engineer is not working on. Omitting step S206 in these cases avoids a waste of system resources in responding to inappropriate requests.

At step S208, the request and/or the result are analyzed against the one or more item access rules. If the request and/or result does not violate an item access rule, control passes to step S212 in which the result is communicated to the requestor via the appropriate technology for the request as known by persons of ordinary skill in the art. If the request does violate an item access rule, control passes to step S210 in which the access control system 122 is notified of the violation.

Item access rules may be further refined to limit or prohibit access to marked items in a data at rest system. The rules limiting access could be similar to the item access rules described herein, but would apply in whole or in part to marked items, as opposed to all items in the data at rest system. Marked items could include any item capable of storage in data at rest systems including, but not limited to, files, images, sound recording and videos. Marked items could be identified in many ways as is known to one of ordinary skill in the art. Examples of such means of identification include, but are not limited to: inclusion of a flag in file attributes; naming conventions; and the creation of a list or database listing marked items. Certain marked items (e.g., security log files) may be so sensitive that any attempts to access the file should automatically trigger intrusion detection. Such intrusion detection may include a variety of components that will vary based on a particular implementation of the invention and procedures of the organization using an embodiment of the invention.

Examples of intrusion detection procedures may include, but are not limited to writing a log, modifying one or more item access rules to place restrictions or prohibition on access to one or more resources for defined period of time or until an administrator restores access, alerting one or more administrators of a potential intrusion, altering one or more intrusion detection profiles and/or item access rules, altering a security level, shutting down one or more data at rest systems, commencing analysis of historical data access records and commencing inference analysis. Analysis of historical data access records may employ methods and/or systems for the compilation of access records, computations of statistics based on the records, and/or presentation of the records and statistics. The presentation of the records and statistics may include textual, pictorial and/or graphical elements.

Inference analysis may include the use of data mining and machine learning technologies and techniques such as Bayes' theorem. For example, anti-spam filters are becoming increasingly sophisticated, with accuracy rates in the high 90 percent being the norm. The best solutions combine Bayesian filtering and content inspection. Most use some combination of Bayesian filtering and content analysis along with whitelists and blacklists. The content filtering will inspect the accessed data element over time and the relation to sensitive data element. As a general rule, accuracy improves when inspection is moved farther away from the desktop and closer to the server.

Bayes' theorem is a facet of probability theory that relates the conditional and marginal probability distributions of random variables. The goal of the inference analysis is to detect patterns and develop heuristics or algorithms that predict intrusions. In machine learning implementations, such as spam filtering or detecting intrusions, Bayes' theorem is instructive on how to update or revise beliefs a posteriori in light of new evidence.

The goal of inference is typically to find the distribution of a subset of the variables, conditional upon some other subset of variables with known values (the evidence), with any remaining variables integrated out. This is known as the posterior distribution of the subset of the variables given the evidence. The posterior gives a universal sufficient statistic for detection applications, when one wants to choose values for the variable subset which minimize some expected loss function, for instance the probability of decision error. A Bayesian network can thus be considered a mechanism for automatically constructing extensions of Bayes' theorem to more complex problems. The most common exact inference methods are variable elimination which eliminates (by integration or summation) the non-observed non-query variables one by one by distributing the sum over the product, clique tree propagation which caches the computation so that the many variables can be queried at one time and new evidence can be propagated quickly, and recursive conditioning which allows for a space-time tradeoff but still allowing for the efficiency of variable elimination when enough space is used. All of these methods have complexity that is exponential in tree width. The most common approximate inference algorithms are stochastic MCMC simulation, mini-bucket elimination which generalizes loopy belief propagation, and variational methods.

In order to fully specify the Bayesian network and thus fully represent the joint probability distribution, it is necessary to further specify for each node X the probability distribution for X conditional upon X's parents. The distribution of X conditional upon its parents may have any form. It is common to work with discrete or Gaussian distributions since that simplifies calculations. Sometimes only constraints on a distribution are known; one can then use the principle of maximum entropy to determine a single distribution, the one with the greatest entropy given the constraints. (Analogously, in the specific context of a dynamic Bayesian network, one commonly specifies the conditional distribution for the hidden state's temporal evolution to maximize the entropy rate of the implied stochastic process.) Often these conditional distributions include parameters which are unknown and must be estimated from data, sometimes using the maximum likelihood approach. Direct maximization of the likelihood (or of the posterior probability) is often complex when there are unobserved variables. A classical approach to this problem is the expectation-maximization algorithm which alternates computing expected values of the unobserved variables conditional on observed data, with maximizing the complete likelihood (or posterior) assuming that previously computed expected values are correct. Under mild regularity conditions this process converges on maximum likelihood (or maximum posterior) values for parameters. A more fully Bayesian approach to parameters is to treat parameters as additional unobserved variables and to compute a full posterior distribution over all nodes conditional upon observed data, then to integrate out the parameters. This approach can be expensive and lead to large dimension models, so in practise classical parameter-setting approaches are more common.

Embodiments of the invention implementing Bayesian inferences may begin with predefined rules and/or beliefs regarding user behaviors. Information is gathered from users' requests. As discussed herein, these requests are evaluated against said rules and beliefs. If a request violates a rule or conforms to a belief that the request constitutes an intrusion, the request is denied. Beliefs may be expressed probabilistically, i.e. instead of predicting whether a request constitutes an intrusion or not, embodiments of the invention herein may produce probabilities that a request constitutes an intrusion. These probabilities may be blended with other probabilities produced through other statistical methods as is well known to those of ordinary skill in the art. See, e.g., Lin, U.S. Patent Application Publication Number 2004/0267893, which is incorporated herein by reference.

Embodiments of the invention utilize outside knowledge to revise beliefs and rules. For example, if a manager requests several documents for a project that she is not affiliated with, embodiments of the invention herein may deny access to the files. The manager may, in turn, contact a helpdesk or other system administrator to justify her need for the files. Assuming that the need is legitimate, the helpdesk or administrator may modify classification of the request as not an intrusion. The invention, in turn, will be less likely to classify similar requests by similar users as an intrusion in the future.

In embodiments of the invention configured to prevent intrusion in a file system, the item access rule may limit the number or read and/or write requests that may be processed by a user and/or a group of users in one or more files, one or more directories, one or more servers and/or the entire file system. Additionally, item access rules may limit the number of files and/or volume of data that may be accessed by a user or group of users in one or more files, one or more directories, one or more servers and/or the entire file system. Embodiments of the invention described herein may be implemented for a variety of file systems including but not limited to those described herein.

In some embodiments of the invention, inference patterns and analysis as described herein are included in intrusion detection policies. A violation of a inference pattern may result in the access control system 122 restricting access to the data at rest system that the requestor is attempting to access and may also restrict access to additional systems including, but not limited to, file system(s), database(s), application(s) and network(s). As described herein, the inference patterns and analysis may include Bayesian inference.

Various embodiments of the invention may produce a scorecard. The scorecard may contain information gathered by sensors 120 and the access control system 122 as well as information from log files including, but not limited to, violation attempts, session statistics and data access statistics. The scorecard may be presented in many formats including, but not limited to, textual, pictorial, graphical and in electronic format, such as a webpage. The scorecard may show data access statistics with respect to an entity including, but not limited to, user, application, database, query and column. The scorecard may also include a metric to represent the severity of a threat. In computing the metric, item requests may be given varying weights depending on the sensitivity of the data.

Embodiments of the invention include a system including an access control manager 122 and one or more sensors 120 as depicted in FIG. 1. The access control manager 122 promulgates item access rules and distributes the item access rules to the one or more sensors 120. The one or more sensors 120 detect violations of item access rules and report the violations to the access control manager 122. In response to a violation, the access control manager 122 may adjust one or more item access rules for user(s), groups(s) and/or all users. The access control system 122 also may adjust one or more item access rules for an item or change the security policy, for example, by activating logging. The access control system 122 may also adjust one or more item access rule with regard to one or more types of network traffic. The sensors 120 may be programmed to monitor traffic at a particular network layer. For example, one or more sensors may monitor traffic at ISO/OSI Layer 2, Layer 3 and/or Layer 7.

Embodiments of the invention also include methods of detecting intrusion in a data at rest system or a database. One or more sensors 120 accumulate results from performed previous requests to an item. One or more sensors 120 receive a request for data in a data at rest system or database from a user. The sensor 120 compares the received request with at least one Bayesian inference pattern in order to determine whether a combination of accesses to the item match said inference pattern. If a combination of accesses to the item match said inference pattern, the sensor 120 notifies the access control system 122. This notification causes the access control system 122 to make the received request an unauthorized request before the result it transmitted to the user.

Figure 3:
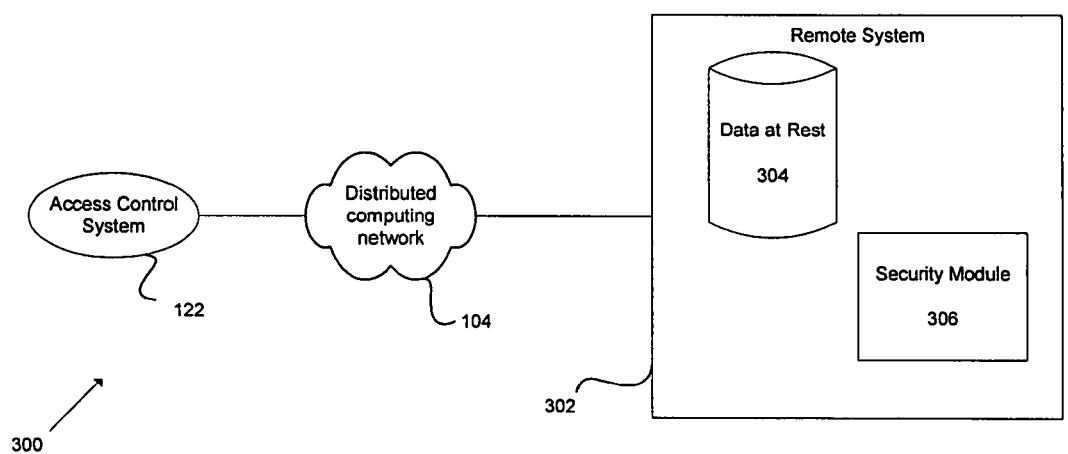
FIG. 3 is a diagram showing another embodiment of inventions described herein in which a data at rest system and a security module reside on a remote system.

Referring now to FIG. 3, the principles described herein may be adapted to reduce reliance on a distributed computing network 104 for data security and intrusion detection. FIG. 3 depicts a system 300 having an access control system 122, a distributed computing network 104, and a remote system 302. The access control system 122 may be a stand-alone system consisting of hardware or hardware/software. Alternatively, access control system 122 may be a software module running on a server or client as described herein. The remote system 302 may be any system containing data, for example servers 106, and clients 108, 116. As depicted in FIG. 3, the remote system 302 includes a data at rest system 304 and a security module 306. The data at rest system 304 may be any system for storing data as described herein.

The security module may 306 may be any system capable of processing requests for data in the data at rest system 304. Examples of suitable security modules 306 include DEFIANCE™ DPS and Secure.Data™ products distributed by Protegrity Corp. of Stamford, Conn. The network 104 may be any network as described herein and may additionally be transient in that the remote system 302 is minimally dependent on the network 104. In some embodiments, the security module 306 is integrated at the operating system level to intercept all requests for sensitive data. In other embodiments, the security module 306 is integrated with specific databases and/or applications. For example, a plug-in for Microsoft Office® (e.g. a Primary Interop Assemblies API) may interact with the Microsoft Office Object Model to regulate how sensitive data is utilized once it is imported into Microsoft Office®. Still other embodiments may utilize both operating system level components and application plug-ins.

The operation of the security module 306 is described below in greater detail below. In some embodiments, the remote system 302 may be authorized to perform a specified number (e.g., 1,000, 10,000, 100,000) of encryption transactions without communicating with the access control system 122. A request for encrypted data in the data at rest system 302 will be handled by security module 306. The security module 306 will determine if an indicator value is within a threshold and return the requested data if the value is below the threshold.

The security module 306 modifies the indicator value to reflect the access and/or access attempt. The indicator value may be increased in some embodiments, or may decrease in others. For example, the indicator value may initially be zero and may be increased towards the threshold of 1,000. Alternatively, the indicator value may be initially be 1,000 and decreased to a threshold of zero.

The indicator value may be may be modified by one or another value for each request for information. Alternatively, the indicator value may be modified for each record returned by the request. For example, if a query to a database returned five social security numbers, the indicator value could be increased by five.

Using the Microsoft Office® plug-in example from above, the security module 306 can be configured to regulate not only how much and/or which sensitive data may be accessed, but also what may be done with accessed sensitive data. For example, the indicator value may be adjusted when sensitive data is imported in Microsoft Excel®. The indicator value may be further adjusted when the sensitive data is copied from or within Microsoft Excel® or when the data is printed. In further embodiments, the security module 306 may encrypt or mask sensitive data that is printed, cut, or copied from an application or database.

As designed, the remote system 302 will require periodic communications with the access control system 122 if a user is to enjoy uninterrupted access to sensitive data. Accordingly, the remote system 302 may be configured to contact the access control system 122 whenever a network connection exists, at a defined interval, when the indicator value is within a defined distance from the threshold, and/or when the indicator value exceeds the threshold. The access control system 122 may communicate with the remote system 302 to modify the indicator value and/or the threshold value.

In another embodiment, the remote system 302 may receive intrusion detection profiles from the access control system 122 as described above. The intrusion detection profiles may include inference patterns as described herein.

In other embodiments, the remote system 302 may send information on requests to the access control system 122. The remote system 302 may only send information on requests that are generated when a network connection exists or the remote system may store information on requests to send when a network connection becomes available.

The functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., modules, databases, computers, clients, servers and the like) shown as distinct for purposes of illustration may be incorporated within other functional elements, separated in different hardware or distributed in a particular implementation.

What is claimed is:

1. A computer-implemented method for data protection comprising:
 receiving a request at a client device from a user for access to a set of one or more data records encrypted with an encryption key and stored in a database comprising at least a plurality of data records;
 accessing by the client device a maintained count associated with the encryption key, the maintained count comprising a sum of database data records encrypted with the encryption key accessed by the user while the client device is not communicatively coupled to a security system, wherein the security system is external to the client device;

responsive to a determination that a sum of the maintained count and a number of records in the requested set of records does not exceed a threshold stored at the client device, the threshold representing a number of records encrypted with the encryption key that the user is authorized to access while the client device is not communicatively coupled to the security system:
  decrypting the set of data records;
  providing the set of decrypted data records to the user; and
  incrementing the maintained count responsive to providing the set of decrypted data records to the user by a number equal to a number of records included in the provided set of decrypted data records; and
responsive to a determination that the sum of the maintained count and the number of records in the requested set of records exceeds the threshold, denying the received request for access to the set of data records.

2. The method of claim 1, wherein denying the received request comprises prompting the user to connect the client device to the security system.

3. The method of claim 2, further comprising:
  receiving instructions from the security system to reset the maintained count in response to the establishment of a connection between the client device and the security system; and
  resetting the maintained count in response to the received instructions.

4. The method of claim 2, further comprising:
  receiving instructions from the security system to modify the threshold in response to the establishment of a connection between the client device and the security system; and
  modifying the threshold in response to the received instructions.

5. The method of claim 4, wherein the request is received via a network layer, and wherein the threshold is modified only for further requests received via the network layer.

6. The method of claim 1, further comprising:
  receiving a request from the user to perform a number of operations on the provided data records;
  accessing by the client device a second maintained count comprising a number of operations the user has performed on accessed data records while the client device is not communicatively coupled to the security system;
  responsive to a determination that the sum of the second maintained count and the number of requested operations does not exceed a second threshold stored at the client device representing a number of operations the user is authorized to perform on provided data records while the client device is not communicatively coupled to the security system:
    performing the requested operations on the provided data records; and
    incrementing the second maintained count response to performing the operations on the provided data records by a number equal to the number of operations performed on the provided data records; and
  responsive to a determination that the sum of the second maintained count and the number of requested operations exceeds the second threshold, denying the request to perform operations on the provided data records.

7. A non-transitory computer-readable storage medium storing computer-executable instructions for data protection, the instructions comprising instructions for:
  receiving a request at a client device from a user for access to a set of one or more data records encrypted with an encryption key and stored in a database comprising at least a plurality of data records;
  accessing by the client device a maintained count associated with the encryption key, the maintained count comprising a sum of database data records encrypted with the encryption key accessed by the user while the client device is not communicatively coupled to a security system, wherein the security system is external to the client device;
  responsive to a determination that a sum of the maintained count and a number of records in the requested set of records does not exceed a threshold stored at the client device, the threshold representing a number of records encrypted with the encryption key that the user is authorized to access while the client device is not communicatively coupled to the security system:
    decrypting the set of data records;
    providing the set of decrypted data records to the user; and
    incrementing the maintained count responsive to providing the set of decrypted data records to the user by a number equal to a number of records included in the provided set of decrypted data records; and
  responsive to a determination that the sum of the maintained count and the number of records in the requested set of records exceeds the threshold, denying the received request for access to the set of data records.

8. The non-transitory computer-readable storage medium of claim 7, wherein denying the received request comprises prompting the user to connect the client device to the security system.

9. The non-transitory computer-readable storage medium of claim 8, further comprising instructions for:
  receiving instructions from the security system to reset the maintained count in response to the establishment of a connection between the client device and the security system; and
  resetting the maintained count in response to the received instructions.

10. The non-transitory computer-readable storage medium of claim 8, further comprising instructions for:
  receiving instructions from the security system to modify the threshold in response to the establishment of a connection between the client device and the security system; and
  modifying the threshold in response to the received instructions.

11. The non-transitory computer-readable storage medium of claim 10, wherein the request is received via a network layer, and wherein the threshold is modified only for further requests received via the network layer.

12. The non-transitory computer-readable storage medium of claim 7, further comprising instructions for:
  receiving a request from the user to perform a number of operations on the provided data records;
  accessing by the client device a second maintained count comprising a number of operations the user has performed on accessed data records while the client device is not communicatively coupled to the security system;
  responsive to a determination that the sum of the second maintained count and the number of requested operations does not exceed a second threshold stored at the client device representing a number of operations the user is authorized to perform on provided data records while the client device is not communicatively coupled to the security system:

performing the requested operations on the provided data records; and incrementing the second maintained count response to performing the operations on the provided data records by a number equal to the number of operations performed on the provided data records; and responsive to a determination that the sum of the second maintained count and the number of requested operations exceeds the second threshold, denying the request to perform operations on the provided data records.

13. A system for data protection comprising:

a non-transitory computer-readable storage medium storing executable computer instructions for:

receiving a request at a client device from a user for access to a set of one or more data records encrypted with an encryption key and stored in a database comprising at least a plurality of data records;

accessing by the client device a maintained count associated with the encryption key, the maintained count comprising a sum of database data records encrypted with the encryption key accessed by the user while the client device is not communicatively coupled to a security system, wherein the security system is external to the client device;

responsive to a determination that a sum of the maintained count and a number of records in the requested set of records does not exceed a threshold stored at the client device, the threshold representing a number of records encrypted with the encryption key that the user is authorized to access while the client device is not communicatively coupled to the security system:

decrypting the set of data records;

providing the set of decrypted data records to the user; and incrementing the maintained count responsive to providing the set of decrypted data records to the user by a number equal to a number of records included in the provided set of decrypted data records; and responsive to a determination that the sum of the maintained count and the number of records in the requested set of records exceeds the threshold, denying the received request for access to the set of data records; and a processor configured to execute the instructions.

14. The system of claim 13, wherein denying the received request comprises prompting the user to connect the client device to the security system.

15. The system of claim 14, the instructions further comprising instructions for:

receiving instructions from the security system to reset the maintained count in response to the establishment of a connection between the client device and the security system; and resetting the maintained count in response to the received instructions.

16. The system of claim 14, the instructions further comprising instructions for:

receiving instructions from the security system to modify the threshold in response to the establishment of a connection between the client device and the security system; and modifying the threshold in response to the received instructions.

17. The system of claim 16, wherein the request is received via a network layer, and wherein the threshold is modified only for further requests received via the network layer.

18. The system of claim 13, the instructions further comprising instructions for:

receiving a request from the user to perform a number of operations on the provided data records;

accessing by the client device a second maintained count comprising a number of operations the user has performed on accessed data records while the client device is not communicatively coupled to the security system;

responsive to a determination that the sum of the second maintained count and the number of requested operations does not exceed a second threshold stored at the client device representing a number of operations the user is authorized to perform on provided data records while the client device is not communicatively coupled to the security system:

performing the requested operations on the provided data records; and incrementing the second maintained count response to performing the operations on the provided data records by a number equal to the number of operations performed on the provided data records; and responsive to a determination that the sum of the second maintained count and the number of requested operations exceeds the second threshold, denying the request to perform operations on the provided data records.

19. A computer-implemented method for data protection comprising:

receiving a request at a client device from a user for access to a set of one or more protected data records stored in a database comprising at least a plurality of data records, the set of protected data records comprising encoded data records;

accessing by the client device a maintained count associated with the user, the maintained count comprising a sum of protected database data records accessed by the user while the client device is not communicatively coupled to a security system, wherein the security system is external to the client device;

responsive to a determination that a sum of the maintained count and a number of records in the requested set of records does not exceed a threshold stored at the client device, the threshold representing a number of protected records that the user is authorized to access while the client device is not communicatively coupled to the security system:

decoding the set of data records;

providing the set of decoded data records to the user; and incrementing the maintained count responsive to providing the set of decoded data records to the user by a number equal to a number of records included in the provided set of decoded data records; and responsive to a determination that the sum of the maintained count and the number of records in the requested set of records exceeds the threshold, denying the received request for access to the set of data records.

* * * * *